D. I. DEGROAT.
Meat-Cutters.

No. 167,649. Patented Sept. 14, 1875.

WITNESSES: O. W. Gerecke
Arthur V. Wiltsie

INVENTOR: D. I. Degroat

UNITED STATES PATENT OFFICE.

DANIEL I. DEGROAT, OF NEWBURG, NEW YORK.

IMPROVEMENT IN MEAT-CUTTERS.

Specification forming part of Letters Patent No. 167,649, dated September 14, 1875; application filed December 4, 1874.

*To all whom it may concern:*

Be it known that I, DANIEL I. DEGROAT, of Newburg, in the county of Orange and State of New York, have invented certain Improvements in Meat-Cutters, of which the following is a specification:

The nature of my invention consists in the construction of a meat-cutter on which the cutter is a double-edged knife, which may be curved or straight, and which is fastened to and across the face of a rotary cutter-head. This cutter-head is fastened to a shaft which rests in bearings, and to which is attached, at the other end, a crank by which the cutter-head is set in a revolving motion.

The meat is fastened to a movable table, which can be made to slide in a frame toward the cutter by means of a screw and nut in the table, and the thickness of the slice of meat to be cut depends on how much the table is moved forward for each revolution of the cutter.

To prevent the meat from crowding against the flat side of the cutter, where the edges cannot cut it in case the cutter is placed right across the center of the cutter-head, a sharp cone, which is at its base larger in diameter than the width of the cutter, is placed right in the center of the cutter, the point projecting toward the meat, and which, when revolving with the cutter, makes a hole in the meat when it is being moved toward the cutter with the table, and leads the meat over the base of the cone, where the sharp edges of the cutter can take a clean cut from the projecting meat.

The side of the cone may be grooved so as to present sharp edges, with which to drill easier a hole in the meat to bring it before the cutter.

To explain this easier I refer to the annexed drawing, in which—

Figure 1:
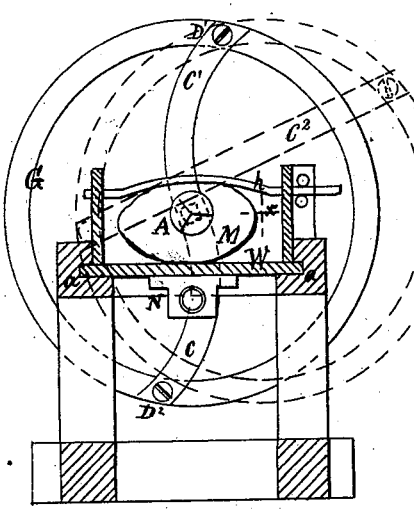
Figure 2:
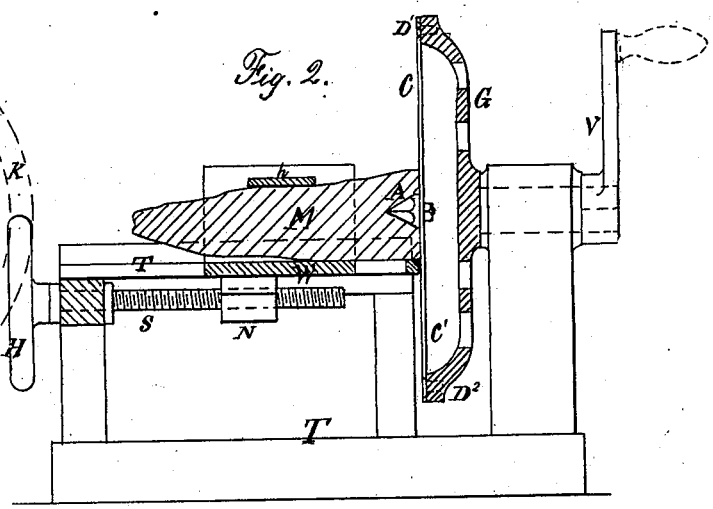
Figure 4:
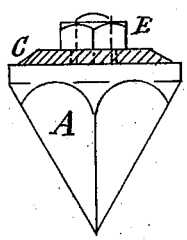
Figure 3:
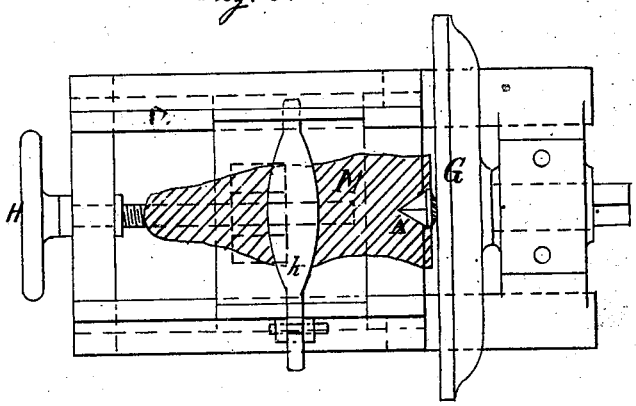

Figure 1 represents a front view; Fig. 2, a side view and partial section; Fig. 3, a plan of the meat-cutter; Fig. 4 shows the cone as fastened to the cutter in larger scale.

T is a frame, in which the movable table W can slide to and fro by means of the screw S, hand-wheel H, and nut N fastened to the table W, and is guided in ways $a$ $a$. M represents a piece of meat to be cut. It is held in position by a clamp, $h$, on the table. G is the cutter-head, which is being revolved by means of a shaft and crank, V, and which is held in the journal-box P. To this cutter-head G is fastened the knife C C', and to the knife C C' is attached a cone, A, which is shown in Fig. 4 in larger scale. This cone A is, at its base, larger in diameter than the cutter C C' is wide. The table W is so arranged that the meat M centers on the point of cone A, and when the meat M is held fast by clamp $h$ and the table W is moved forward by the screw S, the cone A drills a hole in the meat, and when the meat is pushed beyond the base of the cone A the cutter C C' cuts slices of meat from it. The thickness of the slices depends entirely upon how fast the table W is moved forward to each revolution of the cutter-head.

What I claim as my invention, and desire to secure by Letters Patent, is—

The rotary cutter-head G, knife C C', and cone A, substantially as and for the purpose specified.

D. I. DEGROAT.

Witnesses:
   J. W. GERECKE,
   ARTHUR V. WILTSIE.